(12) United States Patent
Yamaguchi et al.

(10) Patent No.: US 6,609,493 B2
(45) Date of Patent: Aug. 26, 2003

(54) SYSTEM AND METHOD FOR ENHANCED COMBUSTION CONTROL IN AN INTERNAL COMBUSTION ENGINE

(75) Inventors: Koichi Yamaguchi, Yokohama (JP); Tomonori Urushihara, Yokohama (JP); Koudai Yoshizawa, Kanagawa (JP); Tsuyoshi Taniyama, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 87 days.

(21) Appl. No.: 09/986,037

(22) Filed: Nov. 7, 2001

(65) Prior Publication Data

US 2002/0059914 A1 May 23, 2002

(30) Foreign Application Priority Data

Nov. 21, 2000 (JP) ........................................ 2000-354388

(51) Int. Cl.[7] .......................... F02M 43/00; F02M 25/07
(52) U.S. Cl. .................. 123/299; 123/304; 123/568.14; 701/105; 701/108
(58) Field of Search ................................ 123/295, 299, 123/300, 304, 305, 435, 436, 472, 478, 480, 492, 493, 568.14, 568.21, 90.15; 701/103, 104, 105, 108, 110; 60/285

(56) References Cited

U.S. PATENT DOCUMENTS

| | | | | |
|---|---|---|---|---|
| 5,669,343 A | | 9/1997 | Adachi ..................... | 123/90.17 |
| 5,785,016 A | | 7/1998 | Enderle et al. .......... | 123/90.11 |
| 5,836,276 A | | 11/1998 | Iwasaki et al. .......... | 123/90.17 |
| 6,386,177 B2 | * | 5/2002 | Urushihara et al. ......... | 123/299 |
| 6,401,688 B2 | * | 6/2002 | Teraji et al. ................. | 123/295 |
| 6,497,213 B2 | * | 12/2002 | Yoshizawa et al. ......... | 123/299 |
| 6,508,229 B2 | * | 1/2003 | Miyakubo et al. .......... | 123/305 |
| 6,530,361 B1 | * | 3/2003 | Shiraishi et al. ............ | 123/435 |
| 2002/0195078 A1 | * | 12/2002 | Hasegawa et al. .......... | 123/294 |

FOREIGN PATENT DOCUMENTS

JP    10-196424    7/1998

OTHER PUBLICATIONS

U.S. patent application Ser. No. 09/934,588, Nohara et al., filed Aug. 23, 2001.

* cited by examiner

Primary Examiner—Willis R. Wolfe
Assistant Examiner—Hai H. Huynh
(74) Attorney, Agent, or Firm—Foley & Lardner

(57) ABSTRACT

A fuel supply system has a fuel injector positioned to directly inject fuel into a combustion chamber, and it is capable of performing a split injection wherein a first fuel injection in each engine cycle precedes a second fuel injection that occurs during compression stroke in the same engine cycle. A spark plug produces a spark to ignite a first air/fuel mixture portion created due to the second fuel injection, initiating a first stage combustion. The first stage combustion raises temperature and pressure high enough to cause auto-ignition of a second air/fuel mixture portion surrounding the first air-fuel mixture portion, initiating a second stage combustion. This control is accomplished by varying at least one of a fuel injection timing of the first fuel injection, a fuel injection timing of the second fuel injection, spark timing, a proportion of fuel quantity of the second fuel injection to the total fuel injected in each engine cycle, and an EGR rate in response to at least one of engine speed and load.

19 Claims, 13 Drawing Sheets

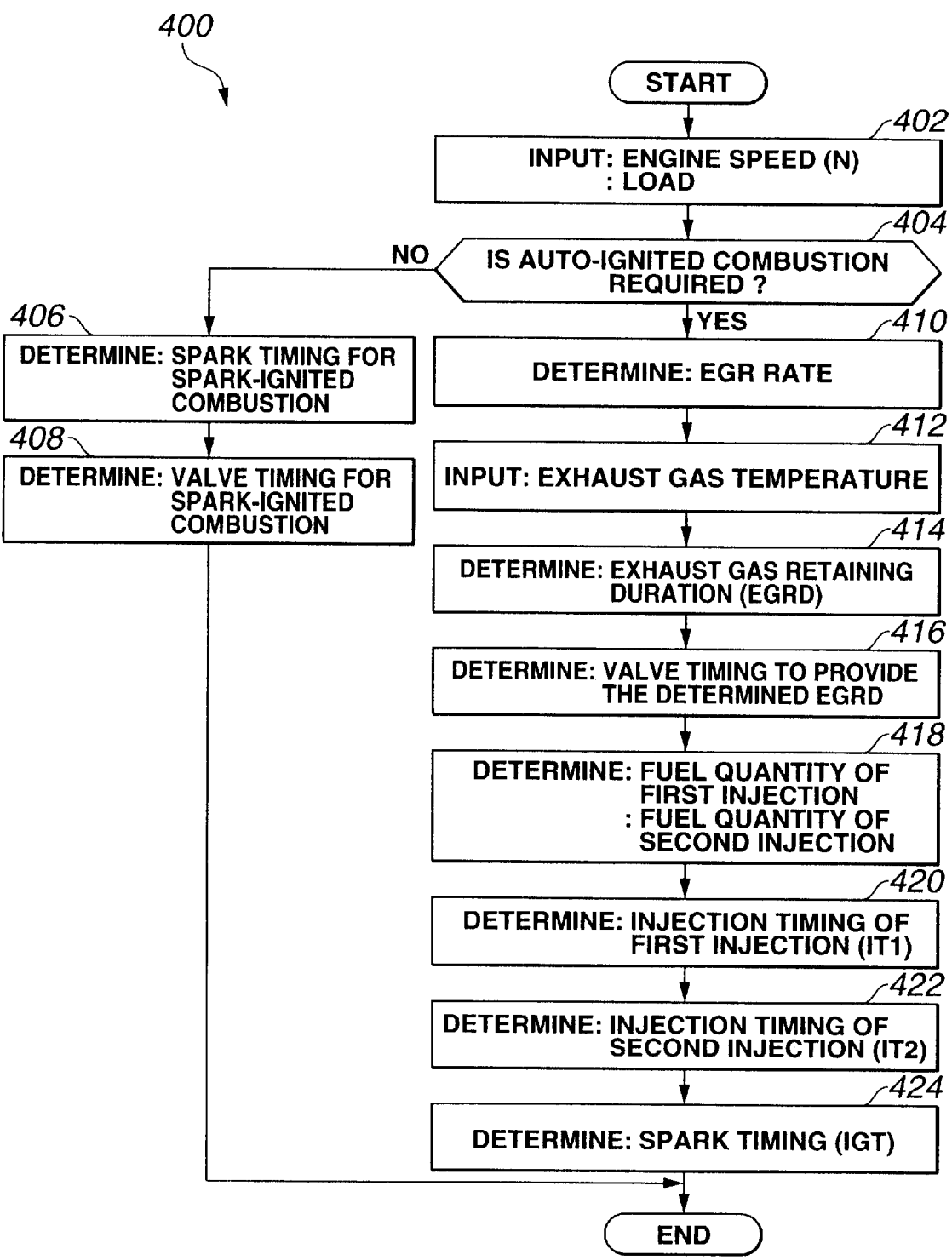

SYSTEM AND METHOD FOR ENHANCED COMBUSTION CONTROL IN AN INTERNAL COMBUSTION ENGINE

BACKGROUND OF THE INVENTION

1. Field of the Invention

The present invention relates to a system and method for enhanced combustion control in an internal combustion engine.

2. Description of Related Art

In a 4-stroke cycle gasoline injected internal combustion engine, when certain conditions are met within a charge of lean air/fuel mixture, auto-ignition can occur wherein bulk combustion takes place initiated simultaneously from many ignition sites within the charge. This results in very stable power output, very clean combustion and high thermal efficiency. NOx emission produced in auto-ignited combustion is extremely low in comparison with spark-ignited combustion. In spark-ignited combustion, the burnt gas temperature is highly heterogeneous within the charge with very high local temperature values, creating high NOx emission. By contrast, in controlled auto-ignited combustion where the combustion is uniformly distributed throughout the charge from many ignition sites, the burnt gas temperature is substantially homogeneous with much lower local temperature values, resulting in very low NOx emission.

In auto-ignited combustion, speed, at which pre-reaction of fuel proceeds with elevation of temperature and pressure, governs an initiation timing of auto-ignited combustion. Accordingly, operating conditions under which auto-ignited combustion may be performed are restricted to a limited engine speed and load range. Auto-ignited combustion, if performed under operation conditions outside of this limited range, may cause the engine to knock or suffer from unstable combustion. Rapid cylinder pressure elevation, if not too excessive to cause the engine to knock, may result in making an unacceptably high level of combustion noise.

In an attempt to govern an initiation timing of auto-ignited combustion, JP-A 10-196424 describes a control piston to provide additional compression around top dead center during compression stroke. A fuel injector is positioned to inject fuel into each intake port. Air/fuel mixture is created by the fuel injected and air introduced into each cylinder during induction stroke of each engine cycle. Increased temperature and pressure due to additional compression of the control piston causes ignition of the air/fuel mixture charge.

SUMMARY OF THE INVENTION

With this known technique, operating conditions under which auto-ignited combustion may be performed remain restricted to such engine speed and load range where the air/fuel mixture charge will not be ignited before TDC during compression stroke.

To maintain thermal efficiency, auto-ignited combustion must be initiated and completed within a limited duration of crank angles. This limited duration shrinks in time as engine speed increases. At high engine speeds, a pressure elevation per unit time needs to be increased to complete combustion within a reduced period of time in each engine cycle. At high or heavy loads, the pressure elevation per unit time increases due to an increase in the total amount of heat generated in each engine cycle. They cause the increased probability for engine to knock at high engine speeds and/or high loads, making it difficult to extend operating conditions, under which auto-ignited combustion may be performed, toward high engine speeds and/or high loads.

It is therefore an object of the present invention to provide a system and method for enhanced combustion control in an internal combustion engine to extend operating conditions, under which auto-ignited combustion may be performed, toward high engine speeds and/or high loads.

According to one aspect of the present invention, there is provided a system for enhanced combustion control in an internal combustion engine having at least one cylinder, a reciprocating piston within the cylinder to define a combustion chamber therein, comprising:

a fuel supply system having a fuel injector positioned to directly inject fuel into the combustion chamber, the fuel supply system being capable of performing a split injection wherein a first fuel injection in each engine cycle precedes a second fuel injection that occurs during compression stroke in the same engine cycle;

a spark plug positioned to produce a spark to ignite a first air/fuel mixture portion created due to the second fuel injection to initiate a first stage combustion, the first stage combustion elevating temperature and pressure high enough to cause auto-ignition of a second air/fuel mixture portion surrounding the first air-fuel mixture portion to initiate an auto-ignited second stage combustion; and an engine controller programmed to perform control over beginning time of the auto-ignited second stage combustion in response to at least one of the engine speed and engine load.

According to another aspect of the present invention, there is provided a method for enhanced combustion control in an internal combustion engine having at least one cylinder, a reciprocating piston within the cylinder to define a combustion chamber therein, comprising:

performing a split injection wherein a first fuel injection in each engine cycle precedes a second fuel injection that occurs during compression stroke in the same engine cycle;

producing a spark to ignite a first air/fuel mixture portion created due to the second fuel injection to initiate a first stage combustion, thereby to cause elevation of temperature and pressure high enough to cause auto-ignition of a second air/fuel mixture portion surrounding the first air-fuel mixture portion to initiate an auto-ignited second stage combustion;

determining beginning time of the auto-ignited second stage combustion in response to at least one of the engine speed and engine load; and performing control over at most an injection timing of the first fuel injection, an injection timing of the second fuel injection, a spark timing, a proportion of fuel quantity of the second fuel injection to the total quantity injected in each engine cycle, and an exhaust gas recirculation (EGR) rate to cause the auto-ignited second stage combustion to begin at the determined beginning time.

BRIEF DESCRIPTION OF THE DRAWINGS

The present invention will be more fully appreciated as the same becomes better understood from the following detailed description when considered in connection with the accompanying drawings, in which like reference numerals and characters designate like or corresponding parts through the several views.

FIG. 19 is a block diagram illustrating a method of the present invention for enhanced combustion control according to the present invention.

BEST MODES FOR CARRYING OUT THE INVENTION

Figure 1:
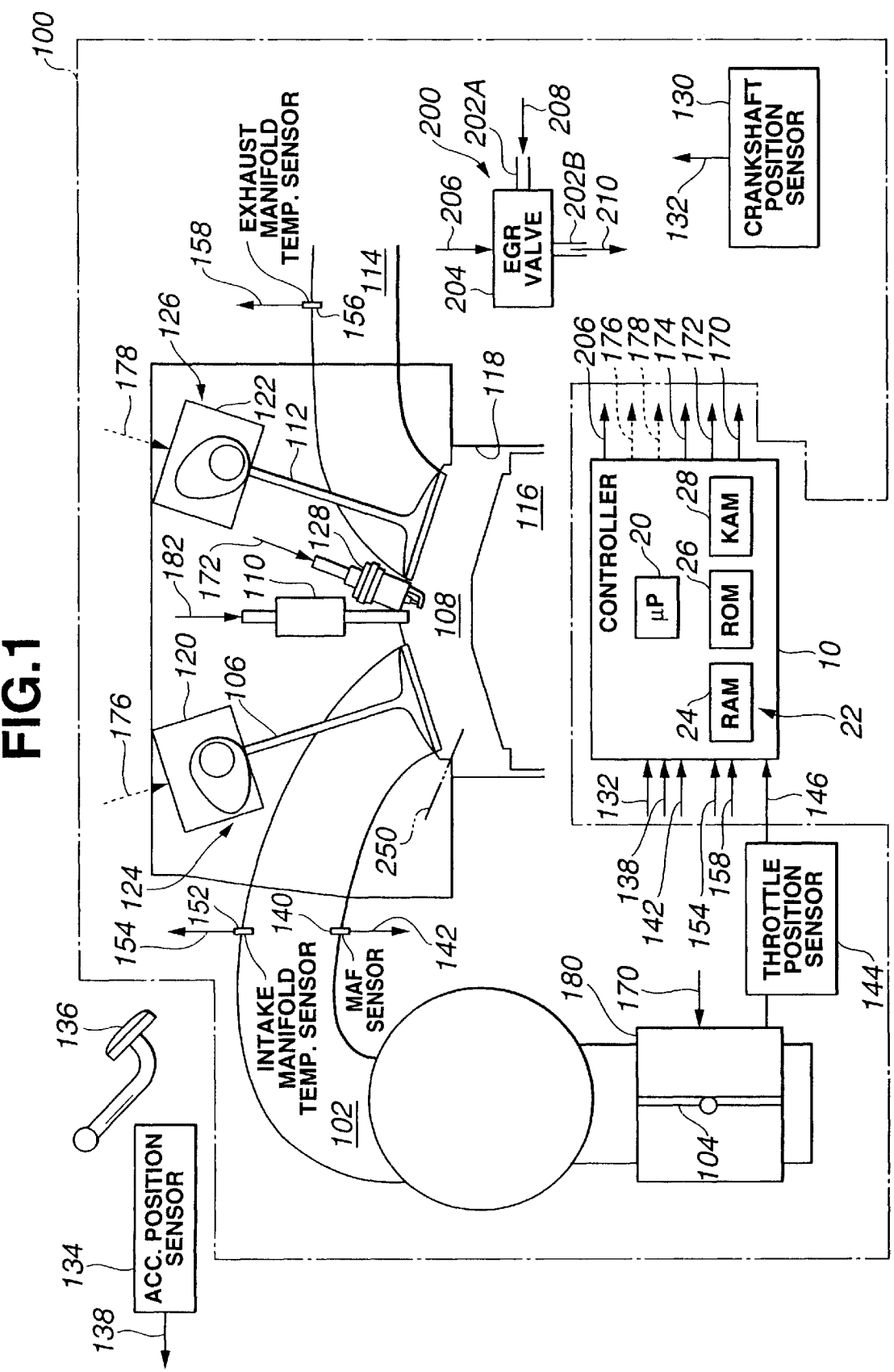
FIG. 1 is a block diagram of a system for enhanced combustion control made according to the present invention.

FIG. 1 shows an electronic engine controller (ECC) 10 and an internal combustion engine 100, which comprises a plurality of cylinders, one of which is shown in FIG. 1. Engine 100 draws an intake air charge through intake manifold 102 past a throttle plate 104, and intake valve 106 and into combustion chamber 108. An air/fuel mixture, which consists of the air charge and gasoline fuel injected by fuel injector 110 of a fuel injection device, is ignited in combustion chamber 108, and exhaust gas resulting from combustion of the air/fuel mixture is transported past exhaust valve 112 through exhaust manifold 114. A piston 116 is coupled to a crankshaft, not shown, and moves in a linear fashion within a cylinder defined by cylinder walls 118.

Valve controllers 120 and 122 are provided to actuate intake and exhaust valves 106 and 112. In a preferred embodiment, intake valve 106 and valve controller 120 constitute an inlet control device 124 for controlling flow of intake air into combustion chamber 108. Exhaust valve 112 and valve controller 122 constitute an outlet control device 126 for controlling flow of exhaust gas resulting from combustion in combustion chamber 108. Fuel injector 110 is positioned to inject fuel directly into combustion chamber 108. A spark plug 128 operates in auto-ignited combustion mode to ignite an air/fuel mixture portion of the charge in combustion chamber 108 to achieve a spark-ignited first stage combustion event as well as in spark-ignited combustion mode to ignite air/fuel mixture in combustion chamber 108.

An EGR system or arrangement, generally indicated at 200, admits a portion of exhaust gas into combustion chamber 108 during induction stroke of each engine cycle. EGR arrangement 200 has, in a conventional manner, a passageway from exhaust manifold 114 to intake manifold 102. A first conduit 202A has an inlet end opening to exhaust manifold 114, and a second conduit 202B has an outlet end opening to intake manifold 102. Situated between first and second conduits 202A and 202B is an EGR valve 204, which forms a part of the passageway. The remaining parts of the passageway are defined by first and second conduits 202A and 202B, respectively. When EGR valve 204 opens, exhaust gas is drawn from exhaust manifold 114 to pass through first conduit 202A as indicated at an arrow 208 and through second conduit 202B as indicated at an arrow 210 into intake manifold 102.

A crankshaft position sensor 130 detects the rotation of the crankshaft and transmits a crankshaft position signal 132 to controller 10. Crankshaft position signal 132 preferably takes the form of a series of pulses, each pulse being caused by the rotation of a predetermined point on the crankshaft past sensor 130. The frequency of pulses on the crankshaft position signal 132 is thus indicative of the rotational speed of the engine crankshaft. An accelerator position sensor 134 detects the angular position of an accelerator pedal 136 and transmits an accelerator position signal 138 to controller 10. Accelerator position sensor 134 preferably takes the form of a potentiometer. A mass air flow (MAF) sensor 140 detects the mass flow rate of intake air through intake manifold 102 and transmits a flow rate signal 142 to controller 10. MAF sensor 140 preferably takes the form of a hot wire anemometer. A throttle position sensor 144 detects the angular position of throttle plate 104 and transmits a throttle position signal 146 to controller 10. Throttle position sensor 144 preferably takes the form of a potentiometer. An intake manifold temperature sensor 152 detects the temperature of intake air within intake manifold 102 and transmits an intake air temperature signal 154 to controller 10. Intake manifold temperature sensor 152 preferably takes the form of a thermistor. An exhaust manifold temperature sensor 156 detects the temperature of exhaust gas within exhaust manifold 114 and transmits an exhaust gas temperature signal 158 to controller 10. Exhaust manifold temperature sensor 156 preferably takes the form of a thermistor.

In one preferred embodiment of the present invention, controller 10 comprises a microprocessor-based controller with associated microprocessor, represented by a reference numeral 20. Microprocessor 20 communicates with associated computer-readable storage media 22. As will be appreciable by one of ordinary skill in the art, computer-readable storage media 22 may include various devices for storing data representing instructions executable by the microprocessor to control the engine. For example, computer-readable storage media 22 may include a random access memory (RAM) 24, a read-only memory (ROM) 26, and/or a keep-alive memory (KAM) 28. These functions may be performed through any one of a number of known physical devices including EPROM, EEPROM, flash memory, and the like. The present invention is not limited to a particular type of computer-readable storage medium, examples of which are provided for convenience of description only.

Controller 10 processes the signals received from the various sensors to generate a throttle actuator control signal 170, a spark timing control signal 172, a fuel injector driver control signal 174, and an EGR valve-opening signal 206. A throttle actuator 180 moves throttle plate 104 in response to throttle actuator control signal 170. Spark plug 128 operates under control of spark timing control signal 172 to provide a spark. Fuel injector 110 preferably takes the form of a solenoid valve and is capable to perform a split injection as well as a single injection in response to an injector control signal 182 received from an injector driver, not shown, which operates under control of fuel injector driver control signal 174 generated by controller 10. Fuel injector 110 receives fuel from a high-pressure fuel supply pump, not shown, and injects fuel directly into combustion chamber 108. EGR valve 204 operates under control of EGR valve-opening signal 206 generated by controller 10 to adjust its valve opening to regulate flow rate of exhaust gas admitted to combustion chamber 108. Inlet and outlet control devices 124 and 126 operate to provide valve timing in a conventional manner.

Figure 2:
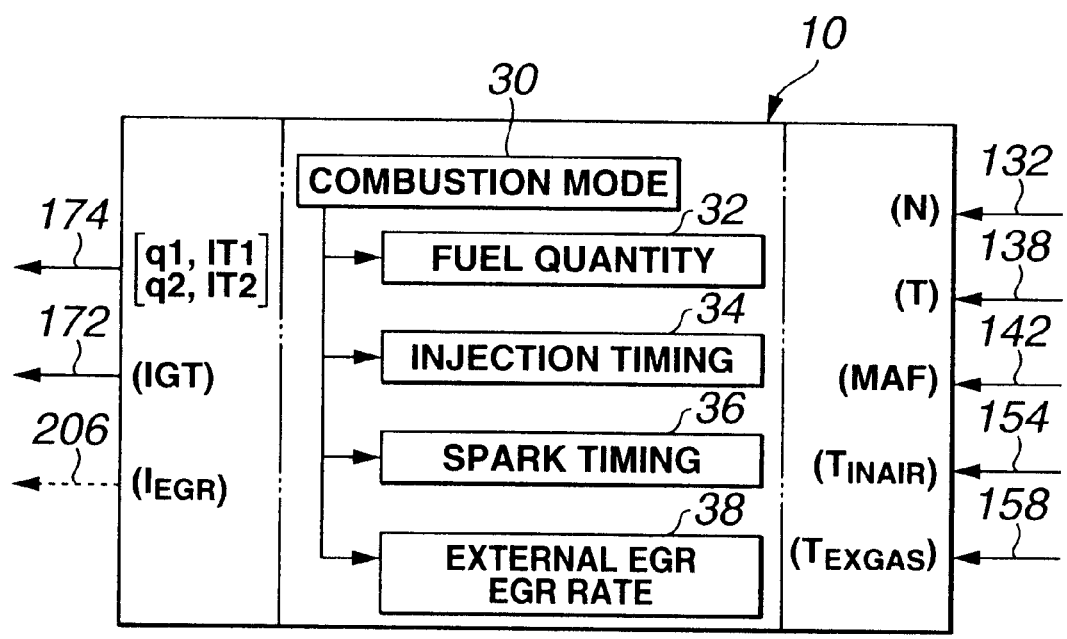
FIG. 2 is a functional block diagram illustrating enhanced combustion control according to the present invention.

Referring to FIG. 2, a functional block diagram illustrating enhanced combustion control will be described. At block 30, controller 10 determines a desired combustion mode between auto-ignited combustion and spark-ignited combustion in response to operating conditions. In response to determined combustion mode, controller 10 performs control over fuel quantity injected, at block 32, injection timing, at block 34, spark timing, at block 36, and EGR rate, at block 38, to optimize combustion control parameters for the type of combustion required in the determined combustion mode. In preferred embodiments, the combustion control parameters include a parameter indicative of combustion timing and a parameter indicative of combustion duration.

As will be appreciated by one of ordinary skill in the art, the determination of combustion mode at block 30, the fuel quantity control at block 32, the injection timing control at block 34, the spark timing control at block 36, and the EGR rate control at block 38 may be effected in software, using any one of a number of known programming techniques or strategies.

Figure 3:
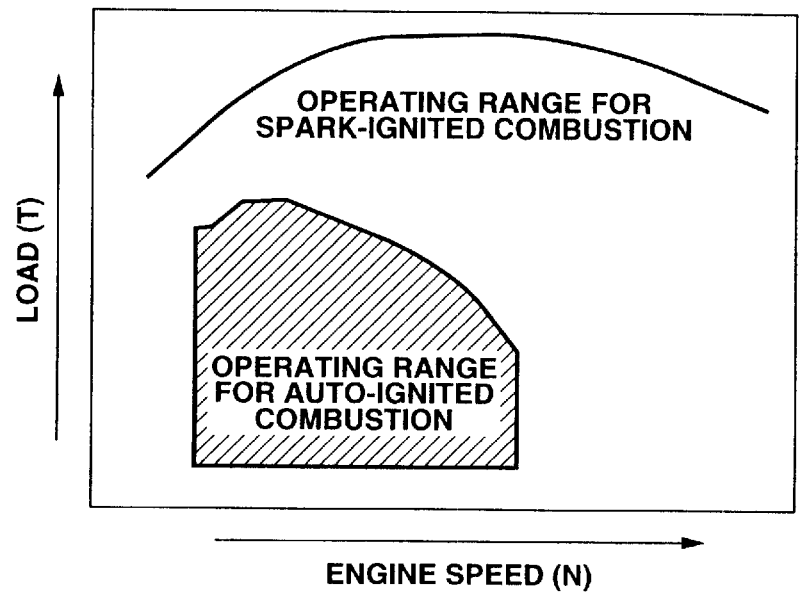
FIG. 3 is a combustion type map illustrating operating range for auto-ignited combustion as separated from operating range for spark-ignited combustion.
Figure 4:
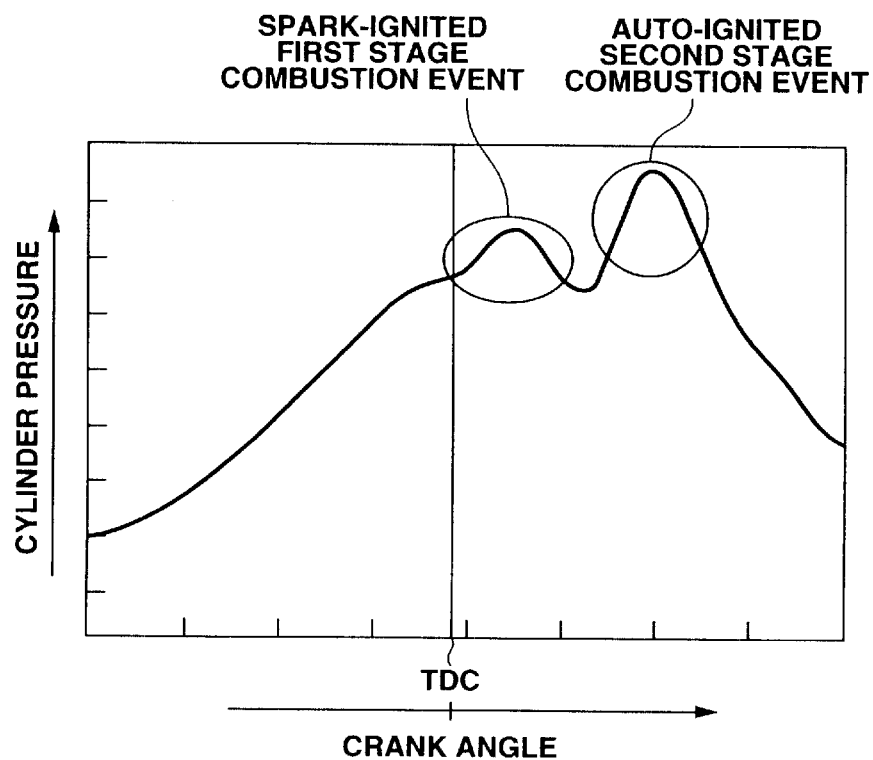
FIG. 4 is a graph depicting a cylinder pressure versus a crank angle.

In one preferred embodiment, controller 10 determines engine speed N from the frequency of crankshaft position signal 132, and load request on engine T, i.e., engine load, from accelerator position signal 138. As best shown in FIG. 3, the illustrated combustion type map clearly specifies the type of combustion required versus differing operating conditions, such as engine speed N and engine load T. Under low and intermediate engine speed and load conditions, an auto-ignited combustion is performed and a spark-ignited combustion is performed otherwise. Controller 10 determines the type of combustion required, spark-ignited combustion or auto-ignited combustion, by table look-up of FIG. 3 using engine speed N and engine load T. As best shown in FIG. 4, the auto-ignited combustion is a two-stage combustion of a stratified air/fuel mixture charge. The stratified air/fuel mixture charge consists of a rich or stoichiometric air/fuel mixture portion created in the neighborhood of spark plug 128 and the surrounding lean air/fuel mixture portion. The two-stage combustion consists of a spark-ignited first-stage combustion event of the rich or stoichiometric air/fuel mixture portion, and an auto-ignited second-stage combustion event of the surrounding lean air/fuel mixture as best shown in FIG. 4, Temperature and pressure elevation due to the first-stage combustion causes auto-ignition of the surrounding air/fuel mixture portion. In FIG. 4, the illustrated cylinder pressure line shows the varying of in-cylinder pressure with differing crank angles of the two-stage auto-ignited combustion in one engine cycle.

To create the stratified air/fuel mixture charge within combustion chamber 108, controller 10 performs a split injection when the auto-ignited combustion is required. Split injection consists of a first injection and then a second injection, which are performed in each engine cycle. The second injection begins after end or completion of the first injection. The second injection is performed during compression stroke of each engine cycle to cause fuel injector 110 to directly inject fuel into combustion chamber 108. The first injection may be performed during induction stroke of each engine cycle. Precise control over fuel quantities injected and injection timing is required to cause fuel of the first injection to disperse widely to create lean air-fuel mixture, and then to cause fuel of the second injection to disperse less widely to create rich or stoichiometric air/fuel mixture portion in the neighborhood of spark plug 128 at around TDC during compression stroke. Direction of fuel injected by fuel injector 110 must be taken into account in achieving the stratified air/fuel mixture charge required. In one preferred embodiment, fuel injector 110 is positioned near spark plug 128 to directly inject fuel into combustion chamber 108 within an area where a spark is produced as shown in FIG. 1. In another embodiment, a fuel injector is positioned at a location, as indicated at 250, near an inlet port closed by intake valve 106 to directly inject fuel into combustion chamber 108 toward a crown of piston. In this case, the piston crown may have a recess with walls to guide the fuel of the second injection toward the area where a spark is produced. The location and orientation of a fuel injector are not restricted to these two examples. Fuel injector may be located and oriented in any other manner as long as fuel quantities injected when performing split injection create rich or stoichiometric air/fuel within an area in the neighborhood of a spark plug and lean air/fuel mixture within the surrounding area.

A spark generated by spark plug 128 under control of spark timing control signal 172 ignites the air/fuel mixture portion created due to second injection. Fuel quantities injected when performing split injection are controlled such that the air/fuel mixture portion created in the neighborhood of spark plug will not be auto-ignited before generation of a spark. The first peak of cylinder pressure line in FIG. 4 shows spark-ignited first stage combustion event initiated by spark. Elevation of pressure and temperature causes auto-ignition of the surrounding lean air/fuel mixture, initiating auto-ignited second stage combustion event. The second peak of the cylinder pressure line in FIG. 4 shows the auto-ignited second stage combustion event.

Figure 5:
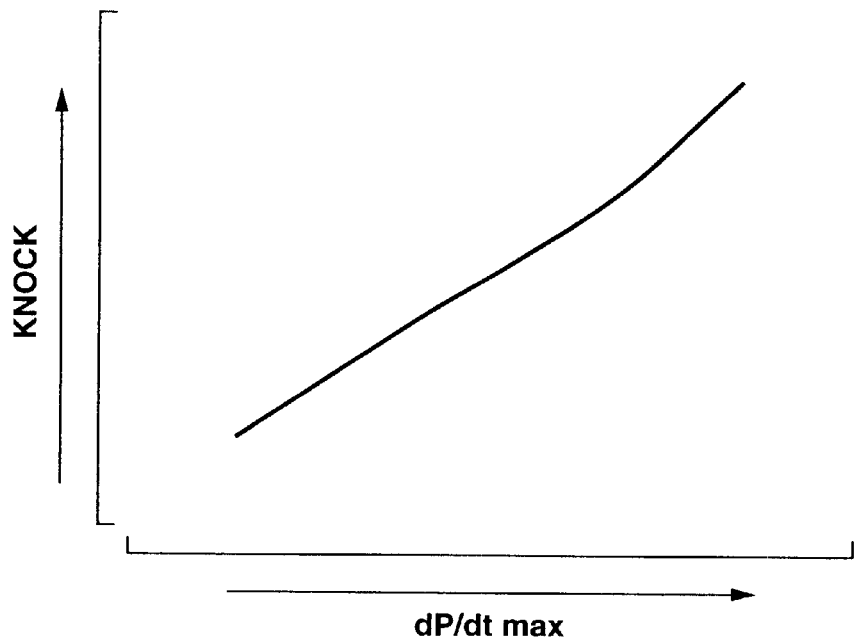
FIG. 5 is a graph depicting a knock versus a maximum cylinder pressure elevation rate.

Control over pressure elevation rate with respect to time in each engine cycle is essential to suppress knock below a sufficiently low level. With reference to FIG. 5, the illustrated line shows that knock is proportional to a maximum pressure elevation rate (MPER) with respect to time $dP/dt_{max}$ over one engine cycle. The inventors herein have employed a combustion control strategy to prevent MPER $dP/dt_{max}$ from exceeding a predetermined value so as to keep knock below the sufficiently low level.

Figure 6:
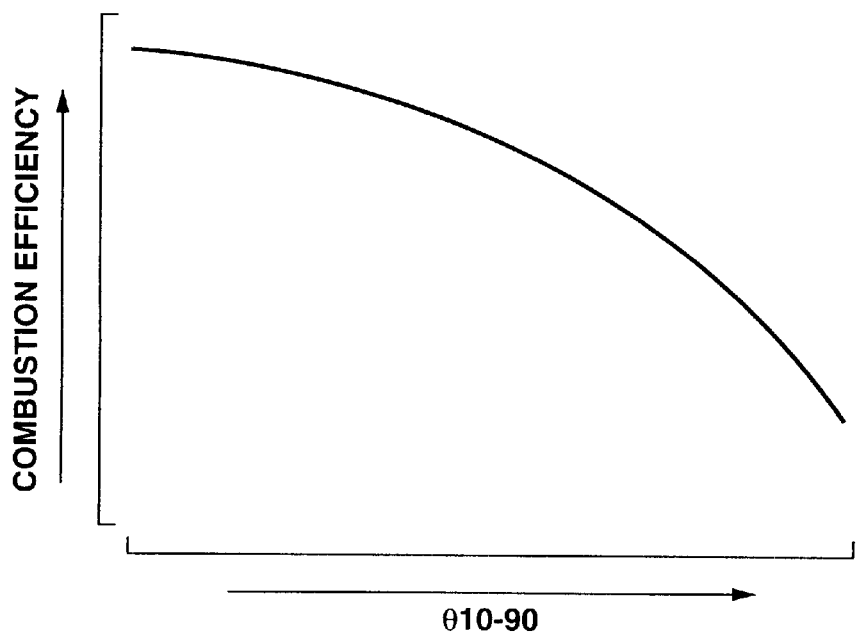
FIG. 6 is a graph depicting a combustion efficiency versus a combustion duration.

Referring to FIG. 6, the variation of combustion efficiency with differing crank angles of combustion duration will now be described. In FIG. 6, the vertical axis represents combustion efficiency, and the horizontal axis represents a combustion duration (CD) parameter ⊖10-90, which is indicative of a combustion duration over one engine cycle. The combustion efficiency is the ratio of the amount of thermal energy generated by actual combustion to the amount of thermal energy generated by complete combustion of all of fuel input over one engine cycle. CD parameter ⊖10-90 represents a duration expressed in crank angles from a crankshaft position at which 10 percent of fuel input has been burnt to a crankshaft position at which 90 percent of the fuel input has been burnt over one engine cycle. In FIG. 6, the illustrated line shows that combustion efficiency drops below an acceptable level as CD parameter ⊖10-90 exceeds a predetermined value. This is because piston descends from TDC while combustion is in progress, making it more and more difficult to completely burn all of fuel input over one engine cycle with the extending of combustion duration. It is to be appreciated that CD parameter ⊖10-90 is one of the combustion control parameters to be optimized.

Figure 7:
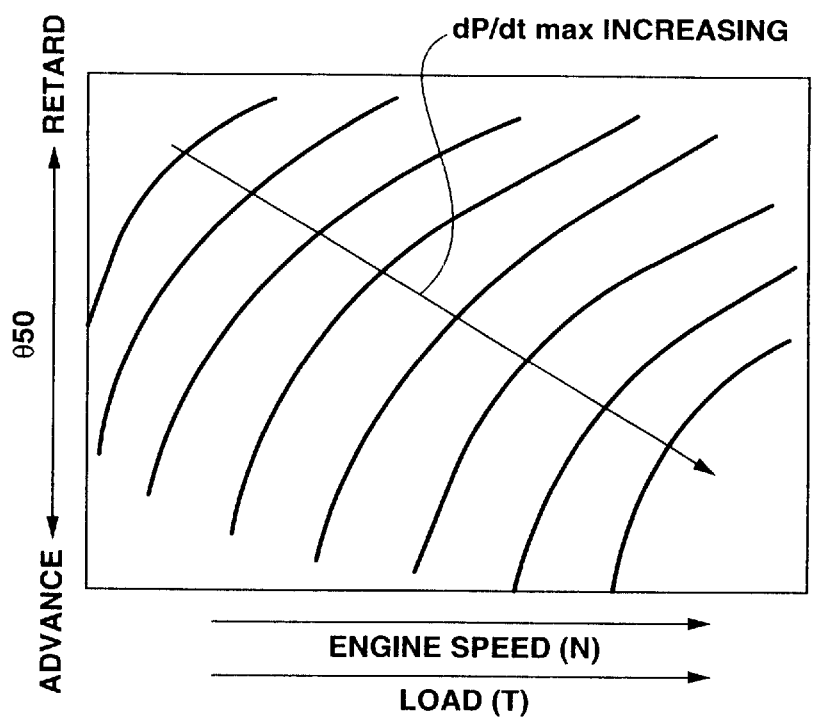
FIG. 7 is a graph depicting contour lines of maximum cylinder pressure elevation rate, each of which illustrates the varying of initiation timing of auto-ignited combustion with differing engine speeds or engine loads to achieve the same maximum cylinder pressure elevation rate.

Referring to FIG. 7, a method of the present invention for determining a desired value of combustion timing will be described. The term "combustion timing" is herein used to mean a beginning time of auto-ignited second stage combustion event. In FIG. 7, the vertical axis represents a combustion timing (CT) parameter ⊖50, and the horizontal axis represents engine speed N or engine load T. CT parameter ⊖50 represents a crankshaft position at which 50 percent of the fuel input has been burnt over one engine cycle. This crankshaft position is regarded as the beginning time of the auto-ignited second stage combustion. In preferred embodiments according to the present invention, the auto-ignited second stage combustion begins after TDC during compression stroke in each engine cycle. Thus, CT parameter ⊖50 is expressed by a delay from TDC during compression stroke. The illustrated MPER $dP/dt_{max}$ contour lines in FIG. 7 show that MPER $dP/dt_{max}$ can be held at any desired value if CT parameter ⊖50 is moved along one contour line, which represents the desired value, against variation of engine speed N or engine load T. With the same engine speed N or engine load T, retarding CT parameter ⊖50 by increasing the amount of a delay from TDC during compression stroke causes a reduction in MPER $dP/dt_{max}$. If the combustion control strategy demands prevention of MPER $dP/dt_{max}$ from exceeding the predetermined value, the operating conditions can be extended toward higher engine speeds or engine loads by retarding CT parameter ⊖50 at least to the corresponding crankshaft position on the one contour line, which represents the predetermined value of MPER $dP/dt_{max}$, to engine speed N or engine load T. Of course, if there is no such corresponding crankshaft position on the contour line to engine speed N or engine load T, such retarding of CT parameter ⊖50 is not needed, so that CT parameter ⊖50 may take any appropriate value as case demands.

As will be appreciated by one of ordinary skill in the art, crankshaft positions to which CT parameter ⊖50 may be retarded are determined by computer simulation or empirically, taking into account also the variation of combustion efficiency as shown in FIG. 6 and other factors. The determined crankshaft positions may be indexed by a range of engine speeds and stored in a look-up table. In this case, a desired value of CT parameter ⊖50 is determined from the look-up table indexed by engine speed. Besides or alternatively, the determined crankshaft positions may be indexed by a range of engine loads and stored in a look-up table. In this case, a desired value of CT parameter ⊖50 is determined from the look-up table indexed by engine load. In one embodiment of the present invention, the look-up table indexed by engine speed is used to determine a desired value of CT parameter ⊖50. In another embodiment of the present invention, the look-up table indexed by engine load is used to determine a desired value of CT parameter ⊖50.

In still another embodiment, a first preliminary desired value of CT parameter ⊖50 is determined from a look-up table indexed by engine speed, and a second preliminary desired value of CT parameter ⊖50 is determined from a look-up table indexed by engine load. In this case, the greater of the first and second preliminary desired values is a desired value of CT parameter ⊖50.

Figure 8:
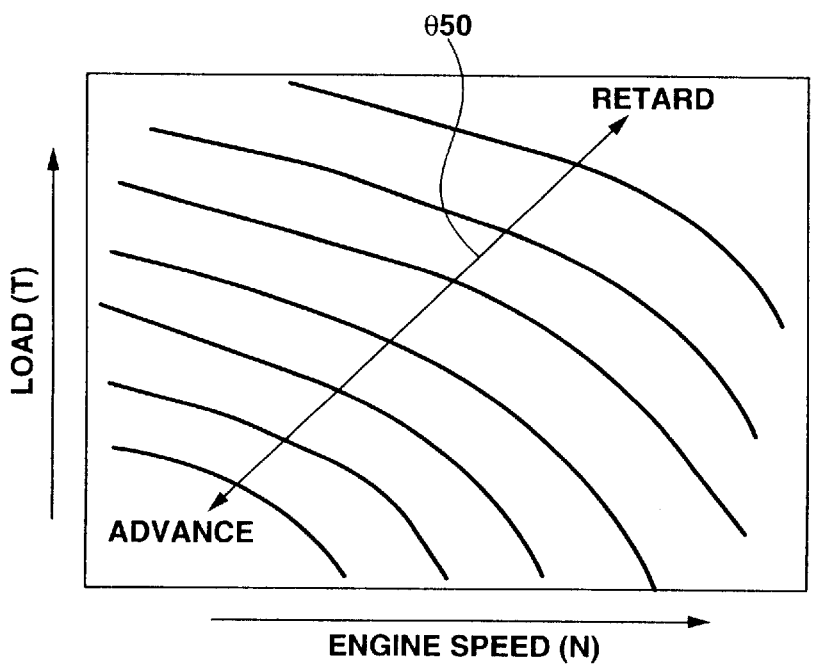
FIG. 8 is a graph depicting contour lines of combustion timing, each of which illustrates the varying of load with differing engine speeds to the same combustion timing.

Referring to FIG. 8, a method of the present invention for determining a desired value of CT parameter ⊖50 against both engine speed N and engine load T for sustaining spark-assist two stage auto-ignited combustion will now be described.

In FIG. 8, the illustrated CT parameter ⊖50 contour lines show desired values of CT parameter ⊖50 against differing engine speeds N and loads T for prevention of MPER $dP/dt_{max}$ from exceeding the predetermined value. These desired values may be determined by computer simulation, which has been conducted taking into account the relation between CT parameter ⊖50, MPER $dP/dt_{max}$ and engine speed N as well as the relation between CT parameter ⊖50, MPER $dP/dt_{max}$, and engine load T. Each of such relations is best shown in FIG. 7. In a preferred embodiment of the present invention, a desired value of CT parameter ⊖50 is determined from a look-up table indexed by engine speed N and engine load T as best shown in FIG. 8. As mentioned before, in embodiments of the present invention, the auto-ignited second stage combustion event begins after TDC during compression stroke in each engine cycle, so that CT parameter ⊖50 indicative of the beginning of auto-ignited second stage combustion is a delay from the TDC.

It is essential to the present invention to perform control over the beginning time of auto-ignited second stage combustion in response to at least one of engine speed and engine load. Operating variables are available, which, if varied, function to assure stable auto-ignited second stage combustion that begins at a crankshaft position indicated by the determined desired value of CT parameter ⊖50. The operating variables are a fuel quantity (q1) of first injection IT1, a fuel quantity (q2) of second injection IT2, a spark timing IGT, a proportion (M) of fuel quantity (q2) of second injection to total fuel quantity (q) injected, and an EGR rate. In one embodiment, control over at least a portion of these operating variables is performed in response to engine speed N to assure stable auto-ignited second stage combustion that begins at the determined desired value of CT parameter ⊖50. In another embodiment, control over at least a portion of these operating variables is performed in response to engine load T to assure stable auto-ignited second stage combustion that begins at the determined desired value of CT parameter ⊖50. In still another embodiment, control over at least one of these operating variables is performed in response to engine speed N and engine load T to assure stable auto-ignited second stage combustion that begins at the determined desired value of CT parameter ⊖50.

With reference to FIGS. 9 to 14, control over the operating variables will be described.

Figure 9:
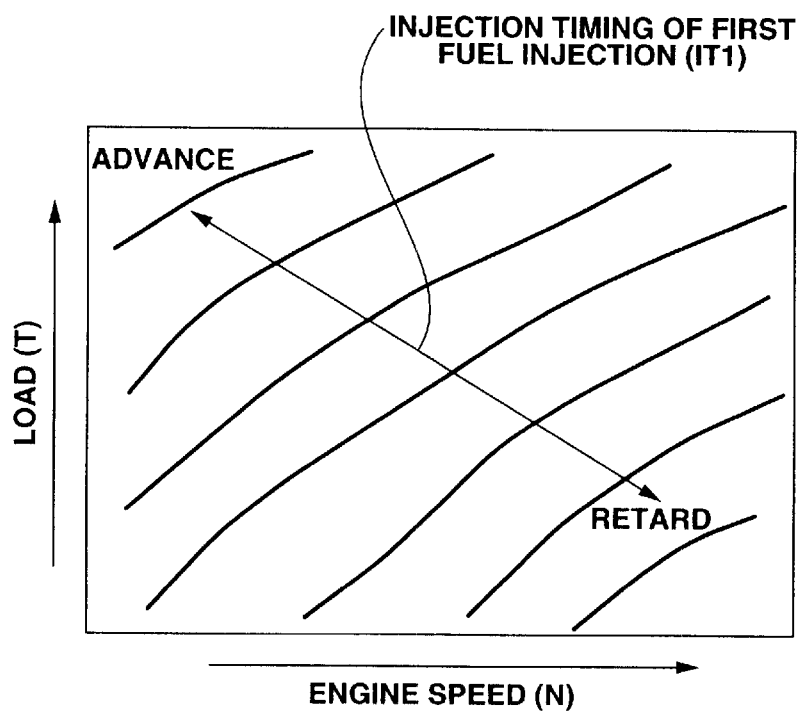
FIG. 9 is a graph depicting contour lines of injection timing of first fuel injection, each of which illustrates the varying of engine load with differing engine speeds to warrant the same injection timing.

Referring to FIG. 9, a method of the present invention for determining injection timing IT1 of first fuel injection will be described. Fuel injection timing IT1 is varied in response to at least one of engine speed N and engine load T. Fuel injected begins dispersing within air charge upon or immediately after first fuel injection. After TDC during intake stroke, the volume of combustion chamber increases due to descending of piston, thus accelerating dispersion of fuel particles. The varying of injection timing IT1 with differing engine speeds N and/or engine loads T as best shown in FIG. 9 causes at least partly creation of air/fuel mixture portion matured for auto-ignition at around a crankshaft position indicated by a desired value of CT parameter ⊖50.

As best shown in FIG. 9, injection timing IT1 of first fuel injection is retarded as engine speed N increases. Total fuel quantity q injected in each engine cycle is determined based on engine load T. The greater the engine load T1 the greater the total fuel quantity q injected. Fuel particles injected make fuel radicals ready for auto-ignition. With the same in-cylinder temperature and pressure conditions, reaction time required for fuel injected by first fuel injection to make fuel radicals remains the same. Dispersion of air/fuel mixture portion to be auto-ignited and a number of fuel radicals therein are two of major factors to determine beginning time of auto-ignited combustion of the mixture. At high engine speeds, it is difficult to take the required reaction time, resulting in a less number of fuel radicals, increasing likelihood of occurrence of instable combustion event and/or low-efficient combustion event with long combustion duration. As mentioned before with reference to FIGS. 7 and 8, a desired value of CT parameter ⊖50 is retarded at high engine speeds. At high engine speeds, in order to bring the air/fuel mixture portion ripe for auto-ignition at a desired retarded crankshaft position indicated by CT parameter ⊖50, injection timing IT1 is retarded as best shown in FIG. 9 to provide, at the crankshaft position, less dispersed air/fuel mixture portion for more concentration of less fuel radicals.

As readily seen from FIG. 9, injection timing IT1 of first fuel injection is advanced as engine load T increases or becomes heavy. At heavy engine loads, total fuel quantity q increases, causing an increase in fuel quantity q1 of first fuel injection if the proportion of fuel quantity q1 to the total q remains the same. At the same engine speed, with the same in-cylinder temperature and pressure at the same engine speed, an increase in fuel quantity injected at the sane injection timing IT1 causes an increased number of fuel radicals, causing auto-ignited combustion to occur at early timing. As mentioned before with reference to FIGS. 7 and 8, a desired value of CT parameter ⊖50 is retarded at heavy engine loads T. At heavy engine loads, in order to bring the air/fuel mixture portion ripe for auto-ignition at a desired retarded crankshaft position indicated by CT parameter ⊖50, injection timing IT1 is advanced as best shown in FIG. 9 to provide, at the crankshaft position, more dispersed air/fuel mixture portion for less concentration of more fuel radicals.

As will be appreciated to one ordinary skill in the art, injection timing IT1 is retarded or advanced in response to engine speed N and/or at high loads T to control dispersion of air/fuel mixture portion prepared fro auto-ignition combustion, thereby to control concentration of fuel radicals within the air/fuel mixture at a crankshaft position indicated by CT parameter ⊖50.

Spark timing IGT is one of the major factors to determine beginning time of auto-ignited combustion event. Spark ignites a rich or stoichiometric air/fuel mixture portion created due mainly to second fuel injection. The thermal and pressure energy due to this spark-ignited combustion event causes auto-ignition of the surrounding air/fuel mixture portion.

Figure 10:
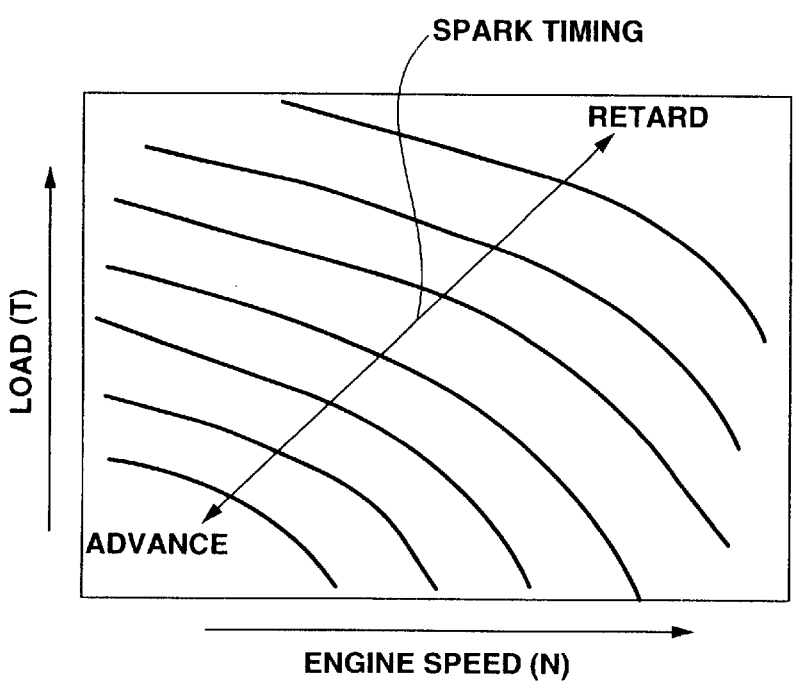
FIG. 10 is a graph depicting contour lines of spark timing, each of which illustrates the varying of engine load with differing engine speeds to warrant the same spark timing.

Referring to FIG. 10, a method of the present invention for determining spark timing IGT will be described. Spark timing IGT is advantageously varied in response to at least one of engine speed N and engine load T to vary beginning time of auto-ignited combustion. If a need arises to retard the beginning time of auto-ignited combustion, spark timing IGT is retarded. If a need arises to advance the beginning time of auto-ignited combustion, spark timing IGT is advanced.

At high engine speeds N, a desired value of CT parameter ⊖50 is retarded as discussed before with reference to FIGS. 7 and 8. Under this operating condition, spark timing IGT is retarded as best shown in FIG. 10. Retarding spark timing IGT in such a manner causes the auto-ignited combustion event to begin at a desired retarded crankshaft position indicated by CT parameter ⊖50 that has been determined at high engine speeds N.

At heavy loads T1 a desired value of CT parameter ⊖50 is retarded as discussed before with reference to FIGS. 7 and 8. Under this operating condition, spark timing IGT is retarded as shown in FIG. 10. Retarding spark timing IGT in such a manner causes the auto-ignited combustion event to begin at a desired retarded crankshaft position indicated by CT parameter ⊖50 that has been determined at heavy engine loads T.

As will be appreciated to one ordinary skill in the art, dispersion of air/fuel mixture portion needs to be controlled to assure stable spark-ignited combustion event. Injection timing IT2 of second fuel injection determines the dispersion of the air/fuel mixture portion.

Figure 11:
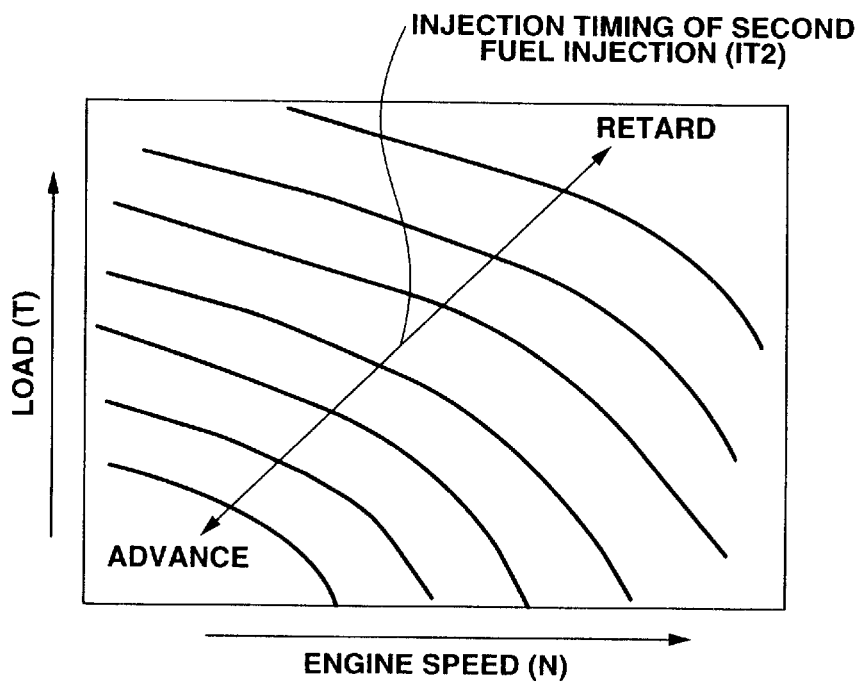
FIG. 11 is a graph depicting contour lines of injection timing of second fuel injection, each of which illustrates the varying of engine load with differing engine speeds to warrant the same injection timing.

Referring to FIG. 11, a method of the present invention for determining injection timing IT2 of second fuel injection will be described. Injection timing IT2 is retarded as ignition timing IGT is retarded to keep stable spark-ignited combustion event irrespective of the varying of spark timing IGT. In one embodiment, injection timing IT2 is varied in response to engine speed N as best shown in FIG. 11 in cooperation with the varying of spark timing IGT with differing engine speeds N as best shown in FIG. 10. In another embodiment, injection timing IT2 is varied in response to engine load T as best shown in FIG. 11 in cooperation with the varying of spark timing IGT with differing engine loads T as best shown in FIG. 10. In other embodiment, injection timing IT2 is varied in response to engine speed N and engine load T as best shown in FIG. 11 in cooperation with the varying of spark timing IGT with both differing engine speeds N and engine loads T as best shown in FIG. 10.

As will be appreciated to one of ordinary skill in the art, control over injection timing IT2 of second fuel injection as best shown in FIG. 11 in cooperation with control over spark timing IGT as best shown in FIG. 10 provides stable spark-ignited combustion event.

As mentioned before, thermal and pressure energy due to spark-ignited combustion causes auto-ignition of the surrounding air/fuel mixture portion. Beginning time of auto-ignited combustion as indicated by CT parameter ⊖50 is retarded at high engine speeds and/or heavy engine loads. This case may demand an increase in the thermal and pressure energy due to spark-ignited combustion to assure the subsequent auto-ignited combustion. The thermal and pressure energy is increased by increasing the proportion of the fuel quantity q2 of second fuel injection to the total fuel quantity q injected.

Figure 12:
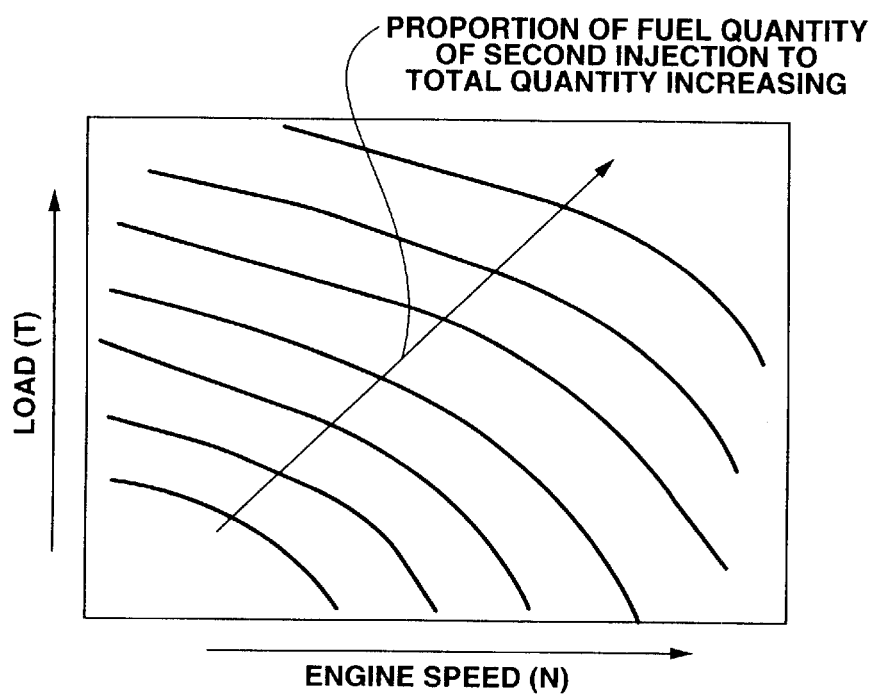
FIG. 12 is a graph depicting contour lines of proportion of fuel quantity of second injection, each of which illustrates the varying of load with differing engine speeds to warrant the same proportion.

Referring to FIG. 12, a method of the present invention for determining the proportion of fuel quantity q2 to the total fuel quantity q will be described. The proportion q2/q is increased in response to at least one of engine speed N and engine torque T. In one embodiment, the proportion q2/q is varied in response to engine speed N as best shown in FIG. 12 in cooperation with the varying of spark timing IGT with engine speed N as best shown in FIG. 10. In another embodiment, the proportion q2/q is varied in response to engine load T as best shown in FIG. 12 in cooperation with the varying of spark timing IGT with engine load T as best shown in FIG. 10. In other embodiment, the proportion q2/q is varied in response to engine speed N and engine load T as best shown in FIG. 12 in cooperation with the varying of spark timing IGT with both engine speed N and engine load T as best shown in FIG. 10.

As will be appreciated to one of ordinary skill in the art that at high engine speeds N and/or heavy engine loads T, the spark timing IGT is retarded in cooperation with the retarding of CT parameter ⊖50, and the injection timing IT2 is retarded to provide stable spark-ignited combustion. Besides, in the embodiments, the proportion q2/q is increased in cooperation of the retarding of spark timing IGT to produce increased thermal and pressure energy to assure the subsequent stable auto-ignited combustion.

The thermal energy of exhaust gas resulting from combustion of the previous cycle may be used to elevate the temperature of air charge in order to provide favorable in-cylinder temperature condition for accelerating reaction of fuel particles to make fuel radicals. In on embodiment according to the present invention, the EGR arrangement 200 (see FIG. 1) is used to conduct a so-called external exhaust gas recirculation (external EGR). Elevation of in-cylinder temperature by external EGR gas is effective in carrying out auto-ignition of gasoline fuel.

Figure 13:
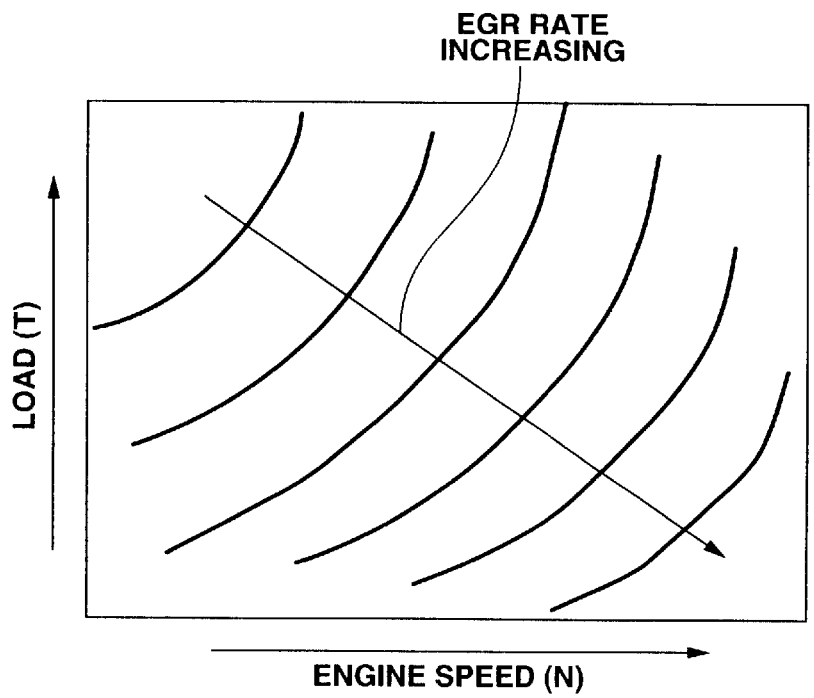
FIG. 13 is a graph depicting contour lines of EGR rate, each of which illustrates the varying of load with differing engine speeds to warrant the same EGR rate.
Figure 14:
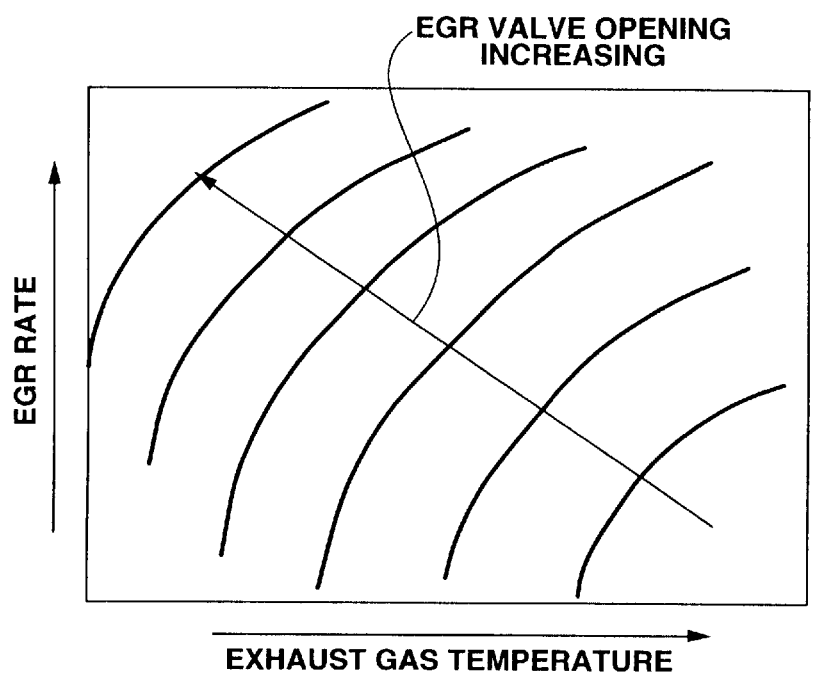
FIG. 14 is a graph depicting contour lines of EGR valve opening, each of which illustrates the varying of EGR rate with differing exhaust gas temperatures to warrant the same EGR valve opening.

With reference to FIGS. 13 and 14, control over external EGR gas admitted to combustion chamber will be described.

Referring to FIG. 13, a method of the present invention for determining the EGR rate will be described. The EGR rate is varied in response to at least one of engine speed N and engine load T. The EGR rate is increased as engine speed N increases as best shown in FIG. 13. This increase of EGR rate keeps good in-cylinder temperature condition for auto-ignition, which might be needed for compensation for a deterioration in conditions for auto-ignition due to the retarding of CT parameter ⊖50 with increasing engine speeds N. The EGR rate is increased at low engine loads as best shown in FIG. 13 to keep good in-cylinder temperature condition for auto-ignition, which might be needed for compensation for deterioration in conditions for auto-ignition due to a reduction of fuel injected at low engine loads. The EGR rate is decreased as engine load T increases as best shown in FIG. 13 to prevent engine knock.

Referring to FIG. 14, a method of the present invention for determining an EGR valve opening will be described. In-cylinder temperature is estimated by monitoring exhaust gas temperature from exhaust gas temperature signal 158 (see FIG. 1). With the same exhaust gas temperature, the EGR valve opening is varied, in a predetermined schedule, with differing EGR rates determined as shown in FIG. 13. However, a correction to increase EGR valve opening is needed to cope with a drop in exhaust gas temperature, while a correction to decrease the EGR valve opening is needed to cope with an increase in exhaust gas temperature. Thus, as shown in FIG. 14, the EGR valve opening is increased as the EGR rate is increased. As best shown in FIG. 14, the EGR valve opening is further increased as exhaust gas temperature is decreased, but it is decreased as exhaust gas temperature is increased. In another embodiment, intake air temperature may be monitored from the intake air temperature signal 154 (see FIG. 1) and may be used instead of the exhaust gas temperature signal in correcting the EGR valve opening that has been determined in response to the determined EGR rate.

Figure 15:
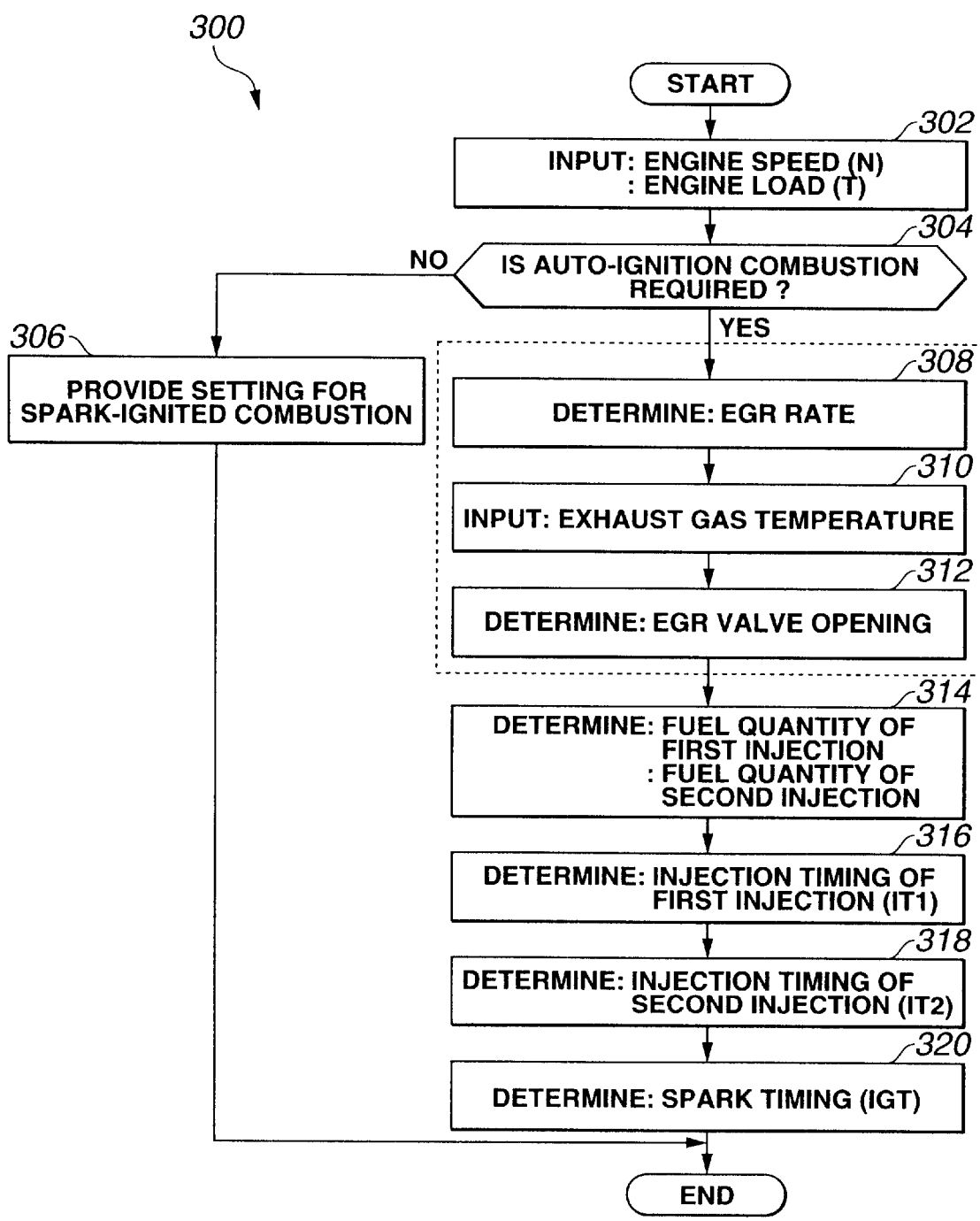
FIG. 15 is a block diagram illustrating a method of the present invention for enhanced combustion control according to the present invention.

Referring to FIG. 15, a method of the invention for enhanced combustion control is generally indicated at 300 and illustrated as a flow chart of control routine. The control routine is executed at regular time intervals or crank angle intervals. At step 302, controller 10 determines engine speed N from crankshaft position signal 132 and engine load T from accelerator position signal 138 or flow rate signal 142. At step 304, controller 10 determines whether or not auto-ignited combustion is required from combustion type map as illustrated in FIG. 3 indexed by engine speed N and engine load T. If it is determined that the auto-ignited combustion is not required and spark-ignited combustion is required, controller 10 provides setting for spark-ignited combustion at step 306, thus allowing usual control over fuel injection and spark timing fit for spark-ignited combustion. If, at step 304, it is determined that auto-ignited combustion is required, controller 10 performs control over fuel injection and spark timing fit for auto-ignited combustion consisting of two-stage combustion events.

At step 308, controller 10 determines EGR rate from a map as illustrated in FIG. 13 indexed by engine speed N and engine load T. At step 310, controller 10 determines exhaust gas temperature $T_{EXGAS}$ from exhaust gas temperature signal 158. At step 312, controller 10 determines EGR valve opening from a map as illustrated in FIG. 14 indexed by EGR rate and exhaust gas temperature $T_{EXGAS}$.

At step 314, controller 10 determines fuel quantity q1 of first fuel injection and fuel quantity q2 of second fuel in the following manner. First, controller 10 determines total fuel quantity q injected in each engine cycle based on engine speed N and engine load T. Second, controller 10 determines the proportion M of fuel quantity q2 of second injection to the total fuel quantity q from a map as illustrated in FIG. 12 indexed by engine speed N and engine load T. Third, controller 10 calculates the following equations to determine fuel quantities q1 and q2.

$$q1 = q \times (1-M) \qquad \text{Eq. 1,}$$

$$q2 = q \times M \qquad \text{Eq. 2}$$

At step 316, controller 10 determines injection timing IT1 of first fuel injection from a map as illustrated in FIG. 9 indexed by engine speed N and engine load T. At step 318, controller 10 determines injection timing IT2 of second fuel injection from a map as illustrated in FIG. 11 indexed by engine speed N and engine load T. At step 320, controller 10 determines spark timing IGT from a map as illustrated in FIG. 10 indexed by engine speed N and engine load T.

Controller 10 performs control over fuel injection and spark timing based on the determined values.

If it is not necessary to rely on EGR rate, steps 308, 310 and 312 may be removed.

The steps shown in FIG. 15 are preferably implemented in controller 10 as a program stored in computer readable storage media 22 (see FIG. 1), which program is executed by microprocessor 20. The maps as illustrated in FIGS. 3 and 8–14 are preferably implemented in controller 10 as look-up tables or maps stored in computer readable storage media 22 (see FIG. 1), which are accessed by microprocessor 20.

In the previously described embodiments, the external EGR is used. In the following embodiment, the internal EGR is used instead of the external EGR and thus, EGR arrangement 200 is no longer necessary.

Referring to FIGS. 16, 17A, 17B, 18, and 19, the embodiment employing internal EGR will be described. This embodiment is substantially the same as the embodiments previously described or mentioned except the provision of the internal EGR instead of the external EGR.

Figure 16:
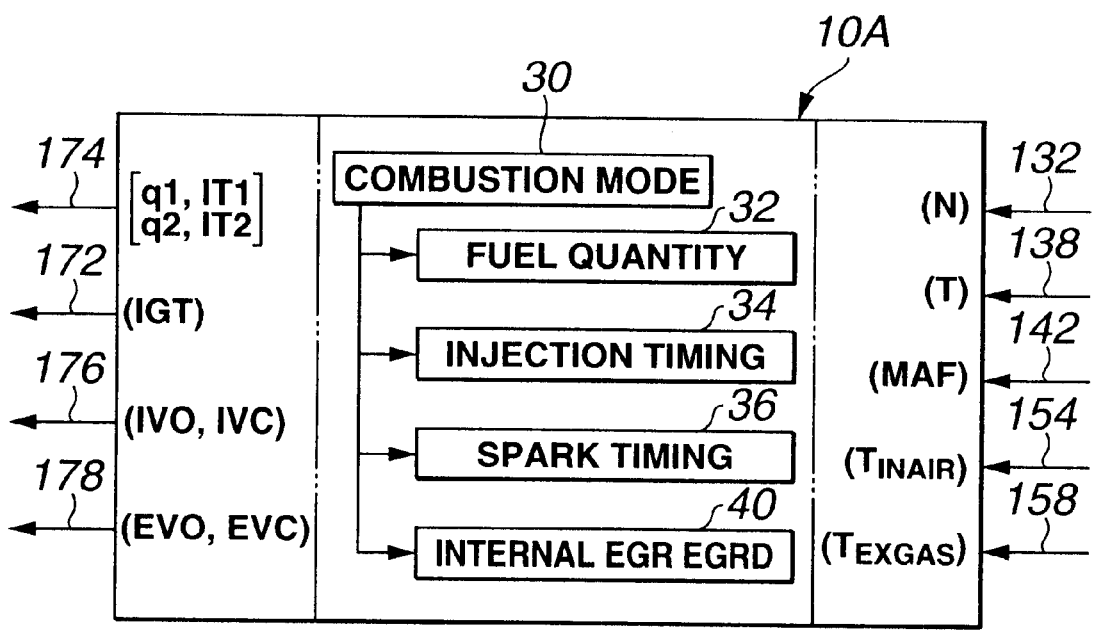
FIG. 16 is a functional block diagram illustrating enhanced combustion control according to the present invention.

FIG. 16 illustrates a functional diagram of enhanced combustion control. An engine controller, now generally indicated at 10A, is substantially the same as controller 10 as shown in FIGS. 1 and 2 except the provision of a functional block 40 for conducting the internal EGR instead of the functional block 38 for conducting the external EGR. At block 40, EGR rate is determined in the same manner as described with reference to FIG. 13, and exhaust gas retaining duration (EGRD) is determined in response to the determined EGR rate and exhaust gas temperature $T_{EXGAS}$. To provide the determined EGRD, controller 10A generates intake and exhaust valve timing signals 176 and 178, respectively. With reference also to FIG. 1, inlet and outlet control devices 124 and 126 operates in response to intake and exhaust timing control signals 176 and 178, respectively, to provide valve timing for spark-ignited combustion as shown in FIG. 17A when spark-ignited combustion is required, and valve timing for auto-ignited combustion as shown in FIG. 17B when auto-ignited combustion is required.

Figure 17A:
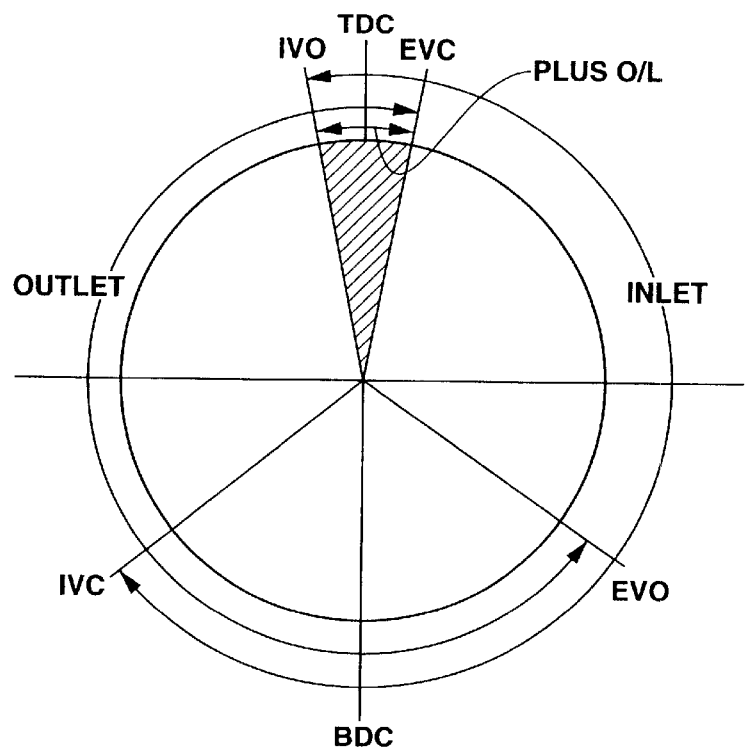
FIG. 17A is a valve-timing diagram with a plus valve overlap (O/L) for spark-ignited combustion.

FIG. 17A provides a valve-timing diagram for spark-ignited combustion. When spark-ignited combustion is required, outlet and inlet control devices 126 and 120 are adjusted to provide optimum valve overlap around TDC during exhaust stroke.

Figure 17B:
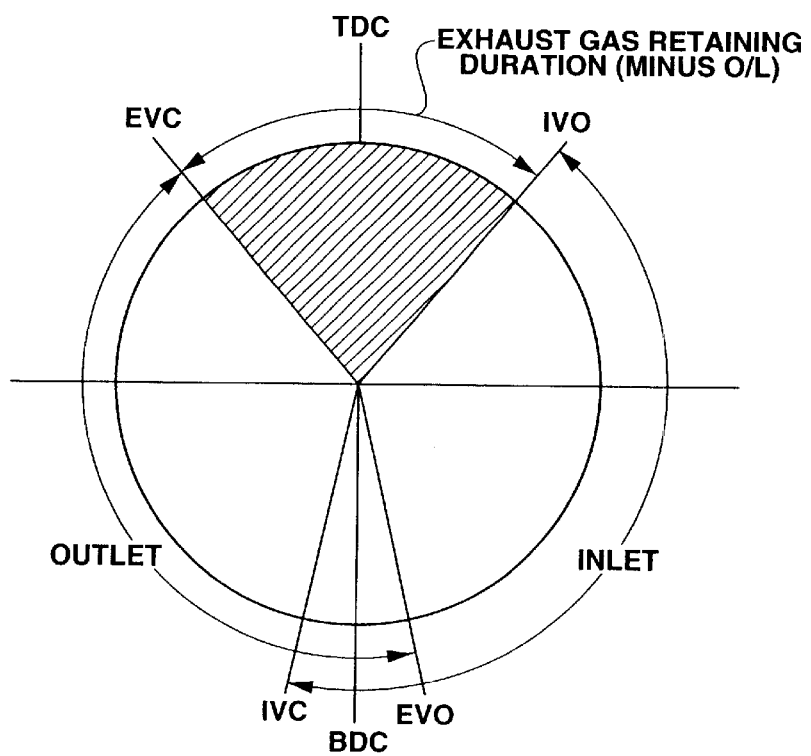
FIG. 17B is a valve-timing diagram with a minus valve overlap (minus OIL) to provide an exhaust gas retaining duration (EGRD) for auto-ignited combustion.

FIG. 17B provides a valve-timing diagram for auto-ignited combustion. For providing in-cylinder temperature condition for auto-ignition, exhaust valve 112 of outlet control device 126 is allowed to close before piston 116 reaches the TDC during exhaust stroke, so that high temperature exhaust gas is retained and compressed during the last travel section of the piston exhaust stroke. Intake valve 106 of inlet control device 124 is opened after the TDC position during exhaust stroke. Setting of opening timing is such that inlet control device 124 is allowed to open after almost all of work done by piston 116 to compress the retained gas has been transferred to energy to move piston 116 in downward direction from the TDC position. Exhaust gas is retained and compressed in cylinder because both outlet and inlet control devices 126 and 124 are allowed to close. Compression of the retained exhaust gas causes an increase in cylinder temperature, which provides advantageous influence on auto-ignition at around TDC during the subsequent compression stroke.

In each of FIGS. 17A and 17B, various abbreviations are used. INLET represents an intake valve, IVO represents intake valve opens, IVC represents intake valve closes, OUTLET represents an exhaust valve, EVO represents exhaust valve opens, and EVC represents exhaust valve closes. O/L represents a valve overlap between INLET and OUTLET. Minus O/L represents a minus valve overlap when both OUTLET and INLET close. Provision of such minus O/L around TDC of exhaust stroke is intended to retain exhaust gas. Exhaust gas retaining duration (EGRD) may be defined as a duration between EVC and IVO in FIG. 17B.

Adjusting the rotational phase of a camshaft or a cam-driving shaft relative to a crankshaft of an engine is a well-known technique to vary valve timing. Examples of valve controllers employing such technique are shown in U.S. Pat. No. 5,669,343 (Adachi), and U.S. Pat. No. 5,836,276 (Iwasaki et al.). It is also known to electromagentically operate a gas exchange valve. A valve controller employing this technique is shown in U.S. Pat. No. 5,785,016 (Enderle et al.).

Any one of the above listed valve controllers may be used in inlet and outlet control devices 124 and 126.

For understanding the recent implementation of the technique to vary valve timing, reference may be made to the commonly assigned pending U. S. patent application Ser. No. unassigned yet, entitled "VARIABLE VALVE CONTROL DEVICE OF INTERNAL COMBUSTION ENGINE", which claims priority based on Japanese Patent Application No. 2000-262109 filed Aug. 31, 2000. The Application discloses in FIGS. 5–9 a phase adjusting mechanism for a gas exchange valve, which may be an intake valve or an exhaust valve. The disclosure of this pending U.S. Patent Application is hereby incorporated by reference in its entirety. The phase adjusting mechanism may be used in inlet and outlet control devices 124 and 126.

Figure 18:
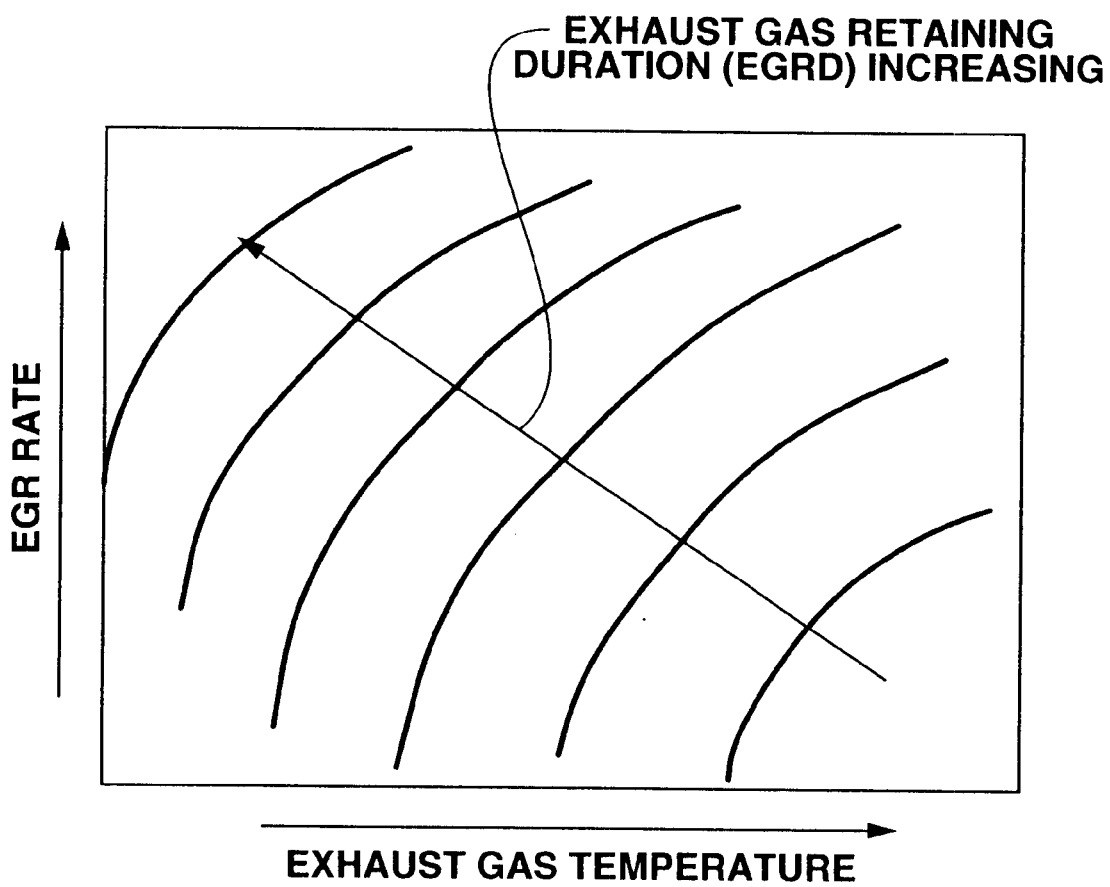
FIG. 18 is a graph depicting contour lines of exhaust gas retaining duration (EGRD), each of which illustrates the varying of EGR rate with differing exhaust gas temperatures to warrant the same EGRD.

Referring to FIG. 18, a method of the present invention for determining EGRD will be described. In-cylinder temperature is estimated by monitoring exhaust gas temperature from exhaust gas temperature signal 158 (see FIG. 1). With the same exhaust gas temperature, the EGRD is varied, in a predetermined schedule, with differing EGR rates determined as shown in FIG. 13. However, a correction to increase EGRD is needed to cope with a drop in exhaust gas temperature, while a correction to decrease the EGRD is needed to cope with an increase in exhaust gas temperature. Thus, as shown in FIG. 18, the EGRD is increased as the EGR rate is increased. As best shown in FIG. 18, the EGRD is further increased as exhaust gas temperature is decreased, but it is decreased as exhaust gas temperature is increased. In another embodiment, intake air temperature may be monitored from the intake air temperature signal 154 (see FIG. 1) and may be used instead of the exhaust gas temperature signal in correcting the EGRD that has been determined in response to the determined EGR rate.

Referring to FIG. 19, a method of the invention for enhanced combustion control is generally indicated at 400 and illustrated as a flow chart of control routine. The control routine is executed at regular time intervals or crank angle intervals. At step 402, controller 10A determines engine speed N from crankshaft position signal 132 and engine load T from accelerator position signal 138 or flow rate signal 142. At step 404, controller 10A determines whether or not auto-ignited combustion is required from combustion type map as illustrated in FIG. 3 indexed by engine speed N and engine load T. If it is determined that the auto-ignited combustion is not required and spark-ignited combustion is required, controller 10A provides setting for spark-ignited combustion, by determining spark timing for spark-ignited combustion at step 406 and by determining valve timing for spark-ignited combustion at step 408, thus allowing usual control over spark timing and valve timing as well as fuel injection. If, at step 404, it is determined that auto-ignited combustion is required, controller 10A performs control over fuel injection and spark timing fit for auto-ignited combustion consisting of two-stage combustion events.

At step 410, controller 10A determines EGR rate from a map as illustrated in FIG. 13 indexed by engine speed N and engine load T. At step 412, controller 10A determines exhaust gas temperature $T_{EXGAS}$ from exhaust gas temperature signal 158. At step 414, controller 10A determines EGRD from a map as illustrated in FIG. 18 indexed by EGR rate and exhaust gas temperature $T_{EXGAS}$, At step 416, controller 10A determines valve timing to provide the determined EGRD.

At step 418, controller 10A determines fuel quantity q1 of first fuel injection and fuel quantity q2 of second fuel in the following manner. First, controller 10A determines total fuel quantity q injected in each engine cycle based on engine speed N and engine load T. Second, controller 10A determines the proportion M of fuel quantity q2 of second injection to the total fuel quantity q from a map as illustrated in FIG. 12 indexed by engine speed N and engine load T. Third, controller 10A determine fuel quantities q1 and q2 by calculating equations 1 and 2.

At step 420, controller 10A determines injection timing IT1 of first fuel injection from a map as illustrated in FIG. 9 indexed by engine speed N and engine load T. At step 422, controller 10A determines injection timing IT2 of second fuel injection from a map as illustrated in FIG. 11 indexed by engine speed N and engine load T. At step 424, controller 10A determines spark timing IGT from a map as illustrated in FIG. 10 indexed by engine speed N and engine load T. Controller 10 performs control over valve timing, fuel injection and spark timing based on the determined values.

The steps shown in FIG. 19 are preferably implemented in controller 10A as a program stored in computer readable storage media 22 (see FIG. 1), which program is executed by microprocessor 20. The maps as illustrated in FIGS. 3, 8–14, and 18 are preferably implemented in controller 10A as look-up tables or maps stored in computer readable storage media 22 (see FIG. 1), which are accessed by microprocessor 20.

While the present invention has been particularly described, in conjunction with preferred implementations and embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. 2000-354388, filed Nov. 21, 2000, the disclosure of which is hereby incorporated by reference in its entirety.

What is claimed is:

1. A system for enhanced combustion control in an internal combustion engine having at least one cylinder, a reciprocating piston within the cylinder to define a combustion chamber therein, comprising:

a fuel supply system having a fuel injector positioned to directly inject fuel into the combustion chamber, the fuel supply system being capable of performing a split injection wherein a first fuel injection in each engine cycle precedes a second fuel injection that occurs during compression stroke in the same engine cycle;

a spark plug positioned to produce a spark to ignite a first air/fuel mixture portion created due to the second fuel injection to initiate a first stage combustion, the first stage combustion elevating temperature and pressure high enough to cause auto-ignition of a second air/fuel mixture portion surrounding the first air-fuel mixture portion to initiate an auto-ignited second stage combustion; and an engine controller programmed to perform control over beginning time of the auto-ignited second stage combustion in response to at least one of the engine speed and engine load.

2. The system as claimed in claim 1, wherein the engine controller is programmed to vary at most an injection timing of the first fuel injection, an injection timing of the second fuel injection, a spark timing, a proportion of fuel quantity of the second fuel injection to the total quantity injected in each engine cycle, and an exhaust gas recirculation (EGR) rate in response to the engine speed.

3. The system as claimed in claim 2, wherein the engine controller is programmed to retard the injection timing of the first fuel injection as the engine speed increases.

4. The system as claimed in claim 2, wherein the engine controller is programmed to retard the spark timing as the engine speed increases.

5. The system as claimed in claim 4, wherein the engine controller is programmed to retard the injection timing of the second fuel injection as the spark timing is retarded.

6. The system as claimed in claim 2, wherein the engine controller is programmed to increase the proportion of the fuel quantity of the second fuel injection as the engine speed increases.

7. The system as claimed in claim 2, wherein there is provided an EGR arrangement to introduce a portion of exhaust gas into the combustion chamber according to the EGR rate, and the engine controller is programmed to increase the EGR rate as the engine speed increases.

8. The system as claimed in claim 2, wherein there are inlet control device for controlling flow into the combustion chamber and an outlet control device for controlling flow out of the combustion chamber, which inlet and outlet control devices are closed to retain a portion of exhaust gas during an exhaust gas retaining duration (EGRD), and wherein the engine controller is programmed to increase the EGRD to increase the EGR rate as the engine speed increases.

9. The system as claimed in claim 1, wherein the engine controller is programmed to vary at most an injection timing of the first fuel injection, an injection timing of the second fuel injection timing, a spark timing, a proportion of fuel quantity of the second fuel injection to total quantity of fuel injected in each engine cycle, and exhaust gas recirculation (EGR) rate in response to the engine load.

10. The system as claimed in claim 9, wherein the engine controller is programmed to advance the injection timing of the first fuel injection as the engine load increases.

11. The system as claimed in claim 9, wherein the engine controller is programmed to retard the spark timing as the engine load increases.

12. The system as claimed in claim 11, wherein the engine controller is programmed to retard the injection timing of the second fuel injection as the spark timing is retarded.

13. The system as claimed in claim 9, wherein the engine controller is programmed to increase the proportion of the fuel quantity of the second fuel injection as the engine load increases.

14. The system as claimed in claim 9, wherein there is provided an EGR arrangement to introduce a portion of exhaust gas into the combustion chamber according to the EGR rate, and the engine controller is programmed to decrease the EGR rate as the engine load increases.

15. The system as claimed in claim 9, wherein there are inlet control device for controlling flow into the combustion chamber and an outlet control device for controlling flow out of the combustion chamber, which inlet and outlet control devices are closed to retain a portion of exhaust gas during an exhaust gas retaining duration (EGRD), and wherein the engine controller is programmed to decrease the EGRD to decrease the EGR rate as the engine load increases.

16. A method for enhanced combustion control in an internal combustion engine having at least one cylinder, a reciprocating piston within the cylinder to define a combustion chamber therein, comprising:

performing a split injection wherein a first fuel injection in each engine cycle precedes a second fuel injection that occurs during compression stroke in the same engine cycle;

producing a spark to ignite a first air/fuel mixture portion created due to the second fuel injection to initiate a first stage combustion, thereby to cause elevation of temperature and pressure high enough to cause auto-ignition of a second air/fuel mixture portion surrounding the first air-fuel mixture portion to initiate an auto-ignited second stage combustion;

determining beginning time of the auto-ignited second stage combustion in response to at least one of the engine speed and engine load; and performing control over at most an injection timing of the first fuel injection, an injection timing of the second fuel injection, a spark timing, a proportion of fuel quantity of the second fuel injection to the total quantity injected in each engine cycle, and an exhaust gas recirculation (EGR) rate to cause the auto-ignited second stage combustion to begin at the determined beginning time.

17. A system for enhanced combustion control in an internal combustion engine having at least one cylinder, a reciprocating piston within the cylinder to define a combustion chamber therein, comprising:

means for performing a split injection wherein a first fuel injection in each engine cycle precedes a second fuel injection that occurs during compression stroke in the same engine cycle;

means for producing a spark to ignite a first air/fuel mixture portion created due to the second fuel injection to initiate a first stage combustion, thereby to cause elevation of temperature and pressure high enough to cause auto-ignition of a second air/fuel mixture portion surrounding the first air-fuel mixture portion to initiate an auto-ignited second stage combustion;

means for determining beginning time of the auto-ignited second stage combustion in response to at least one of the engine speed and engine load; and means for performing control over at most an injection timing of the first fuel injection, an injection timing of the second fuel injection, a spark timing, a proportion of fuel quantity of the second fuel injection to the total quantity injected in each engine cycle, and an exhaust gas recirculation (EGR) rate to cause the auto-ignited second stage combustion to begin at the determined beginning time.

18. A system for enhanced combustion control in an internal combustion engine having at least one cylinder, a reciprocating piston within the cylinder to define a combustion chamber therein, comprising:

a fuel supply system having a fuel injector positioned to directly inject fuel into the combustion chamber, the fuel supply system being capable of performing a split injection wherein a first fuel injection in each engine cycle precedes a second fuel injection that occurs during compression stroke in the same engine cycle;

spark plug positioned to produce a spark to ignite a first air/fuel mixture portion created due to the second fuel injection to initiate a first stage combustion, thereby to cause elevation of temperature and pressure high enough to cause auto-ignition of a second air/fuel mixture portion surrounding the first air-fuel mixture portion to initiate an auto-ignited second stage combustion;

an engine controller; and computer readable storage media having data stored therein representing instructions executable by the engine controller to perform control over beginning time of the auto-ignited second stage combustion in response to at least one of the engine speed and engine load.

19. The system as claimed in claim 18, wherein the computer readable storage media comprises:

instructions for determining beginning time of the auto-ignited second stage combustion in response to at least one of the engine speed and engine load; and instructions for performing control over at most an injection timing of the first fuel injection, an injection timing of the second fuel injection, a spark timing, a proportion of fuel quantity of the second fuel injection to the total quantity injected in each engine cycle, and an exhaust gas recirculation (EGR) rate to cause the auto-ignited second stage combustion to begin at the determined beginning time.

* * * * *